United States Patent

Fischer

[15] 3,687,437
[45] Aug. 29, 1972

[54] METALLURGICAL FURNACES OR VESSELS

[72] Inventor: Wilhelm Anton Fischer, Ratingen, Germany

[73] Assignee: Dynamit Nobel Aktiengesellschaft, Troisdorf, Germany

[22] Filed: Aug. 19, 1970

[21] Appl. No.: 65,232

[52] U.S. Cl.....................................266/43, 13/35
[51] Int. Cl...............................................F27b 14/00
[58] Field of Search.....13/35; 264/30; 266/43; 75/95

[56] References Cited

UNITED STATES PATENTS

| | | | |
|---|---|---|---|
| 1,800,034 | 4/1931 | Unger | 13/35 |
| 3,048,481 | 8/1962 | Eastman | 264/30 |
| 3,401,226 | 9/1968 | Renkey | 13/35 |
| 1,904,664 | 4/1933 | Neuhauss | 13/35 |
| 2,293,089 | 8/1942 | Wainer | 266/43 |
| 3,427,390 | 2/1969 | Renkey et al. | 266/43 |
| 3,492,383 | 1/1970 | Heimgartner | 266/43 |

*Primary Examiner*—Gerald A. Dost
*Attorney*—McGlew and Toren

[57] ABSTRACT

A metallurgical furnace or vessel is provided with a refractory lining consisting of an outer layer of tamped granular ceramic material and an inner layer, which forms a protective sheathing for the outer layer and consists of bricks made of fused lime, fused dolomite, chrome magnesite, or fused magnesia. The tamped layer of ceramic material may consist of fused magnesia or stabilized zirconium oxide or alternatively of granular quartzite, corumdum, mullite or spinel. In the latter case, an intermediate layer is provided between the tamped layer and the inner brick layer to prevent reaction between the bricks and the tamped material. The intermediate layer consists of fused magnesia or stabilized zirconium oxide.

13 Claims, 2 Drawing Figures

METALLURGICAL FURNACES OR VESSELS

This invention relates to refractory linings of metallurgical furnaces and vessels, for example induction furnaces and vacuum furnaces, mixers, vacuum vessels or ladles in which the lining is made of basic fused oxides, for example fused lime, fused dolomite or fused magnesia.

It is known to use fused lime, fused dolomite or fused magnesia and chrome magnesite for refractory furnace linings. For example a process is known for making linings for metallurgical furnaces, in which burnt lime is melted and crushed, and the crushed material is tamped in place to form the lining. Alternatively the fused burnt lime can be used in the form of bricks for building up the lining. The fines of the fused lime crushed material having a grain size under 0.12 mm can be separated and replaced by equally fine magnesite.

Another known refractory lining for metallurgical furnaces consists of fused lime, up to 20 percent magnesia and up to 3 percent silicic acid. The mixture is melted together, cast and crushed after cooling.

However it has not been possible in practice, up to the present time, to construct durable linings of basic fused oxides in furnaces or vessels of more than one metric ton capacity which are to be used, for example, for melting alloyed steels. The method used up to now for making these linings has been to introduce either a dry granular mixture of the fused oxides, or a granular mixture wetted with Diesel oil, between the furnace jacket and an internal sheet metal retainer, the granular material being tamped in place. The same method has been used for lining the coils of induction furnaces, the granular material being tamped in place between the lined coil and an internally positioned sheet metal retainer. In practice linings constructed in this way are insufficiently durable, for example in a one metric ton medium frequency furnace for batch melting highly alloyed steels a fused lime lining constructed in this way lasts for only about twenty charges.

Intensive observations have shown that the inner surface of a lining made of fused oxides, particularly fused lime, becomes fissured after only a few charges, the fissures becoming wider and deeper from charge to charge, penetrating deeper and deeper into the tamped mass with increasing sintering of the mass. As a result of considerable risk of furnace rupture arises, a hazard which is extremely dangerous, particularly in the case of induction furnaces with water cooled coils. This hazard increases from charge to charge.

The known linings have a further disadvantage, in that during shut down periods, particularly during the warm months of the year, and also during weekends, the linings absorb water from the atmosphere, due in particular to condensation of water on the surfaces of water cooling tubes. Absorption of water results in the formation of calcium hydroxide. This causes the lining to swell, resulting in further cracks, and in some cases the lining deforms the coil to such an extent that the coil can be torn away from its anchoring points.

One reason for the development of the fissures is that these linings, particularly linings made of fused lime, have comparatively high thermal expansion coefficients. A further cause of crack formation is the high local temperature fluctuations to which the lining can be subjected in batch operations. The temperature fluctuations can be as great as 1,000° C, for example in the case where a vessel is emptied of a melt at 1,740° C and then charged with cold scrap.

The object of the present invention is to overcome these difficulties and to provide a lining which is less sensitive than previous linings to moisture and less inclined to develop cracks. To this end, according to this invention, a metallurgical furnace or vessel has a refractory lining comprising two layers, one being a tamped layer of ceramic material and the other forming a protective sheathing for the first layer and being of fused lime, fused dolomite, chrome magnesite or fused magnesia bricks.

The tamped layer is preferably consists of granular fused magnesia or of stabilized zirconium oxide. Such a tamped layer, contained between a jacket of the furnace or vessel, or a lined furnace coil, and the protective sheathing layer is comparatively insensitive to moisture, because neither magnesia nor stabilized zirconium oxide readily form hydroxides. Moreover both these substances have high softening points, and neither form low melting eutectics with the material of the sheathing, in particular with fused calcium oxide or fused dolomite. Consequently the tamped material does not readily become sintered. The tamped material easily responds to expansion of the sheathing, without any risk arising of fissure formation or damage to a furnace coil.

The tamped mass can alternatively be made of other ceramic materials, for example quartzite, corundum, Mullite ($3Al_2O_3 \cdot 2SiO_2$) or spinel ($MgO \cdot Al_2O_3$). However these materials are capable of forming low melting eutectics with lime and consequently it is necessary to interpose between the tamped layer and the sheathing layer, an intermediate layer made of fused magnesia or stabilized zirconium oxide.

The thickness of the sheathing layer of fused lime, fused magnesia, chrome magnesite or fused dolomite need be only 40 mm, but can if desired be greater. The bricks used for the sheathing layer may be made by compressing a granular mixture, which can for example contain a binder of a synthetic resin. Consequently the bricks can be used either in the form of "green" bricks, or in the form of sintered bricks. The sintering temperature should be at least 1,250°C and is preferably between 1,600° and 1,650°C. With regard to the tamping mass from which the tamped layer is formed a particularly suitable material for this is a dry fused magnesia of the following grain size distribution:

| | |
|---|---|
| 30% | up to 0.12 mm |
| 20% | 0.25 to 0.5 mm |
| 25% | 1 to 2 mm |
| 25% | 2 to 4 mm |

Two examples of furnaces lined in accordance with the invention will now be described with reference to the accompanying drawings, in which.

Figure 1:
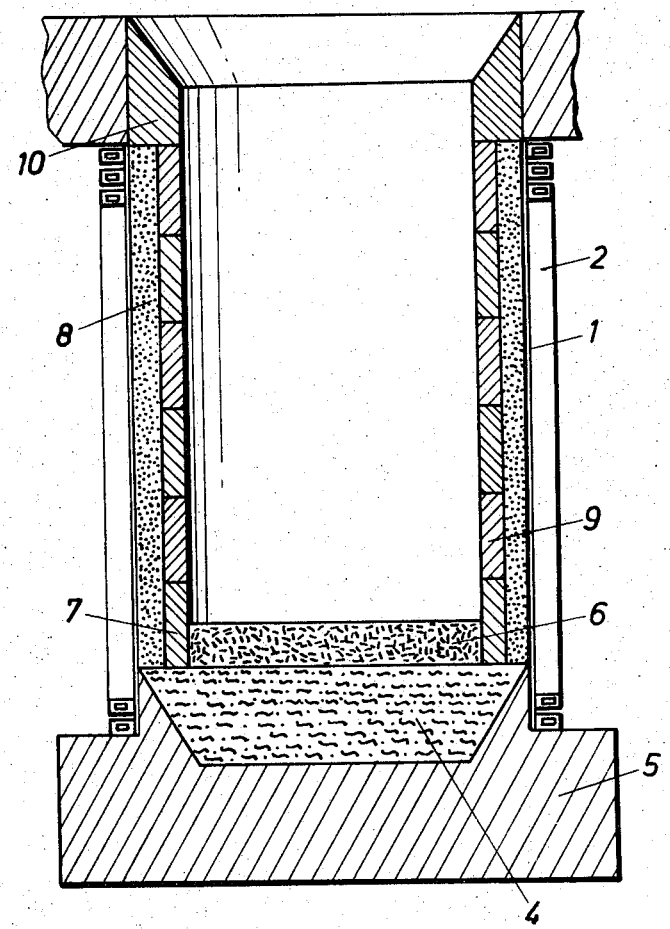
FIG. 1 is a vertical axial section through the first example.
Figure 2:
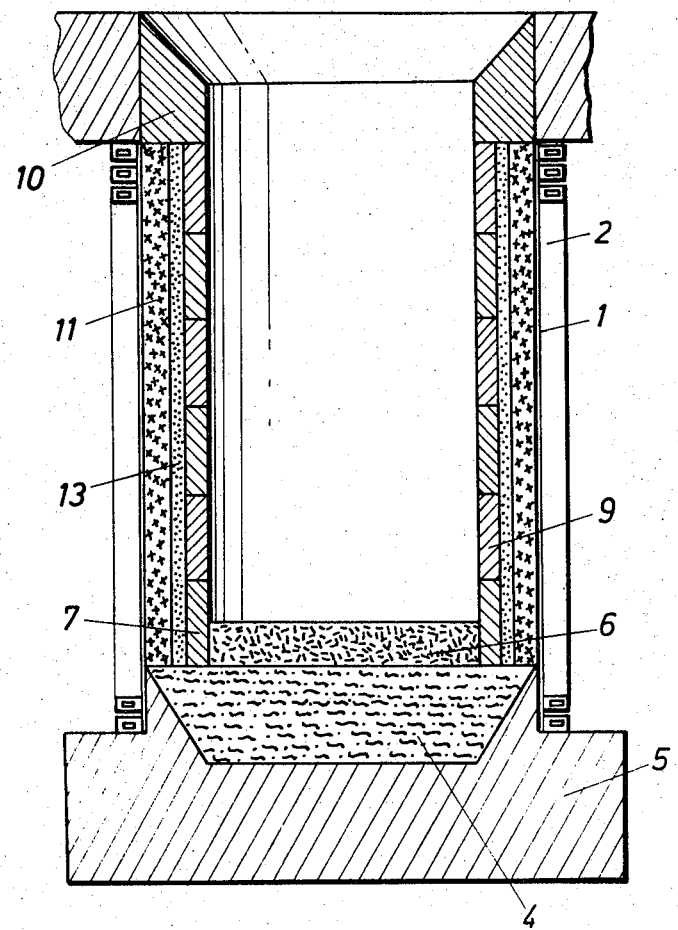
FIG. 2 is a vertical axial section through the second example.

In both examples the furnace is a medium frequency induction furnace. In both examples the furnace comprises a cylindrical steel jacket 1 and an induction coil 2 made of copper tubing through which a cooling medium can circulate. The jacket, is first of all provided with a lining made of glass fibers, asbestos, or of a mixture containing quartz, this lining having an approximately cylindrical inner surface. The coil 2 rests on a foundation 5 of the customary kind made of fireclay, the foundation 5 supporting a tamped floor 6 consisting of dry fused magnesia.

In the first example, a ring 7 of curved fused oxide bricks is first of all built on the floor. The space between the brick ring 7 and the lined jacket 1 is then filled with fused magnesia 8, which is tamped in place. A further brick ring 9 is then superposed on the first brick ring 7, and again the annular space is filled with tamped fused magnesia. The furnace lining is built up in this way to the required height. If desired, a quantity of dry fused magnesia of a grain size less than 12 mm can be sprinkled between the brick rings for compensating uneven brick surfaces. When the furnace lining has been built up to the required height, a headstone 10 is installed and tamped in place with the help of a damp mixture of fused magnesia and waterglass.

Alternatively, as shown in the second example, if desired refractory substances which fairly readily form low melting eutectics with the lime of the brick sheathing can be used for the tamped layer 11. In this case, though an intermediate layer 13 consisting of either fused magnesia or stabilized zirconium oxide is interposed between the tamped mass 11 and the sheathing 12 of fused lime or fused dolomite.

A furnace lining constructed in accordance with the invention, has a considerably longer working life, compared with tamped linings constructed by the customary methods. This is due to the protective effect of the sheathing layer, Assuming the same melting programme, the lining according to the present invention lasts between 2 and 3 times as long as a conventional lining, allowing up to 60 batches to be melted.

For containing a melt with an oxidizing slag or into which oxygen is fed, the part of the sheathing layer which comes into contact with the slag is preferably made of fused magnesia bricks. On the other hand if the slag is not highly oxidizing, the brick in contact with the slag can be made of fused dolomite.

A highly basic and highly refractory lining made in accordance with the invention opens up new fields of application for induction furnaces. Metals can be melted under extremely basic slags, to give products containing extremely little sulphur. Furthermore fused lime has an extremely low oxygen partial pressure, and consequently, in spite of the high temperatures involved, the steel takes up very little oxygen and the alloying elements which have a high affinity for oxygen are hardly oxidized. This makes it possible to add alloying elements of high oxygen affinity directly in the furnace, where the reaction products settle better than they do if the additions are made during the pouring into the ladle. The lining in accordance with the invention is particularly suitable for vacuum furnaces and for vacuum vessels.

The lining in accordance with the invention, makes it possible to exploit on a large scale the metallurgical advantages provided by fused lime, fused dolomite, fused magnesia and chrome magnesite brick linings. This has hitherto not been possible due to the low durability of these bricks when used by themselves.

I claim:

1. In a metallurgical furnace or vessel, an improved refractory lining including inner and outer layers, said outer layer being of tamped granular fused magnesia or stabilized zirconium oxide and said inner layer being of bricks made of fused lime, fused dolomite, chrome magnesite or fused magnesia, said inner layer forming a protective sheathing for said outer layer.

2. In a metallurgical furnace or vessel, an improved refractory lining including an inner layer, an outer layer and an intermediate layer, said outer layer being of tamped granular quartzite corundum, mullite or spinel, said inner layer being of bricks made of fused lime, fused dolomite, chrome magnesite or fused magnesia, and said intermediate layer being of fused magnesia or stabilized zirconium oxide, said inner layer forming a protective sheathing for said intermediate layer and said outer layer.

3. A furnace or vessel as claimed in claim 1, wherein said inner layer includes a lower part of fused lime bricks for contacting molten metal in said furnace or vessel and an upper part of fused dolomite bricks for contacting slag in said vessel or furnace.

4. A furnace or vessel as claimed in claim 2, wherein said inner layer includes a lower part of fused lime bricks for contacting molten metal in said furnace or vessel and an upper part of fused dolomite bricks for contacting slag in said vessel or furnace.

5. A furnace or vessel as claimed in claim 1, wherein said inner layer includes a lower part of fused lime bricks or fused dolomite bricks for contacting molten metal in said furnace or vessel and an upper part of fused magnesia bricks for contacting slag in said furnace or vessel.

6. A furnace or vessel as claimed in claim 2, wherein said inner layer includes a lower part of fused lime bricks or fused dolomite bricks for contacting molten metal in said furnace or vessel and an upper part of fused magnesia bricks for contacting slag in said furnace or vessel.

7. A furnace or vessel as claimed in claim 1, wherein said outer layer consists of fused magnesia containing at least 90 percent MgO and having a grain size distribution of 50 percent below 0.5mm and 50 percent between 1 and 4mm, said fused magnesia being tamped dry.

8. A furnace or vessel as claimed in claim 2, wherein said outer layer consists of fused magnesia containing at least 90 percent MgO and having a grain size distribution of 50 percent below 0.5mm and 50 percent between 1 and 4mm, said fused magnesia being tamped dry.

9. A furnace or vessel as claimed in claim 7, wherein said outer layer has the following grain size distribution:

| | |
|---|---|
| 30% | up to 0.12 mm |
| 20% | 0.25 to 0.5 mm |
| 25% | 1 to 2 mm |
| 25% | 2 to 4 mm |

10. A furnace or vessel as claimed in claim 8, wherein said outer layer has the following grain size distribution:

| | |
|---|---|
| 30% | up to 0.12 mm |
| 20% | 0.25 to 0.5 mm |
| 25% | 1 to 2 mm |
| 25% | 2 to 4 mm |

11. A furnace or vessel as claimed in claim 1, further including dry fused magnesia of a grain size less than 0.12 mm between said bricks in said inner layer.

12. A furnace or vessel as claimed in claim 1, wherein said inner layer has a thickness of at least 40 mm.

13. A furnace or vessel as claimed in claim 2, wherein said inner layer has a thickness of at least 40 mm.

* * * * *